United States Patent
Martin et al.

(10) Patent No.: US 6,195,785 B1
(45) Date of Patent: Feb. 27, 2001

(54) PROCESS AND DEVICE FOR VALIDATING/INVALIDATING A MESSAGE SENT OVER AN INFORMATION TRANSMISSION NETWORK BY MEANS OF A RESPONSE IN A COMMUNICATION FRAME

(75) Inventors: Paul Martin, Mareil Marly; Francois Kaag, Valentigney, both of (FR)

(73) Assignees: Automobiles Peugeot, Paris; Automobiles Citroen, Neuilly-sur-Seine, both of (FR)

( * ) Notice: Subject to any disclaimer, the term of this patent is extended or adjusted under 35 U.S.C. 154(b) by 0 days.

(21) Appl. No.: 09/084,088

(22) Filed: May 26, 1998

(30) Foreign Application Priority Data

May 27, 1997 (FR) .................................................... 97 06479

(51) Int. Cl.$^7$ .......................... G06F 11/00; G08C 25/00; H03M 13/00; H04L 1/00
(52) U.S. Cl. ...................... 714/799; 714/48; 340/825.16; 370/349
(58) Field of Search ............................... 714/799, 49, 50, 714/51, 52, 53, 54; 340/825.51, 825.16; 701/102; 370/216, 230, 252, 349

(56) References Cited

U.S. PATENT DOCUMENTS 5,473,691 * 12/1995 Mezes et al. ............................ 714/54
5,592,618 * 1/1997 Micka et al. ............................ 380/25

* cited by examiner

Primary Examiner—Emmanuel L. Moise
(74) Attorney, Agent, or Firm—Burns, Doane, Swecker & Mathis, L.L.P.

(57) ABSTRACT

This process for validating/invalidating a message (4) sent over a information transmission network between at least two stations connected to said network by means of a response in a communication frame, the message including at least one header field (5) sent by a first station and one data field (6) sent by a second station, is characterized in that the data field (6) includes an end of field marker (7) and a beginning of field marker (8), modified in a manner that respectively corresponds to the beginning and to the end of an operation to update the remainder of the data field (6) carried out by the station concerned, to enable the message (4) to be validated if the two markers correspond and to be invalidated if they do not agree.

6 Claims, 2 Drawing Sheets

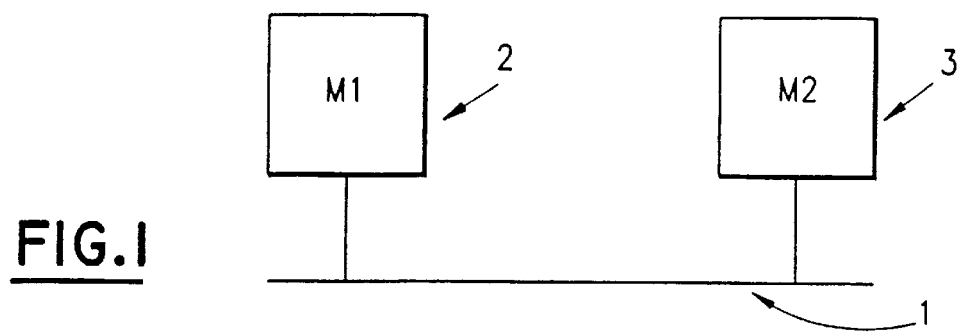
FIG.1
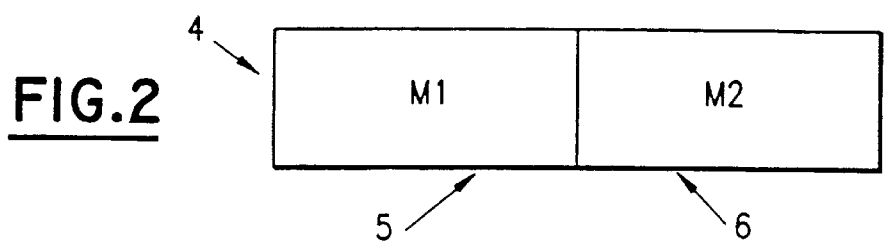
FIG.2
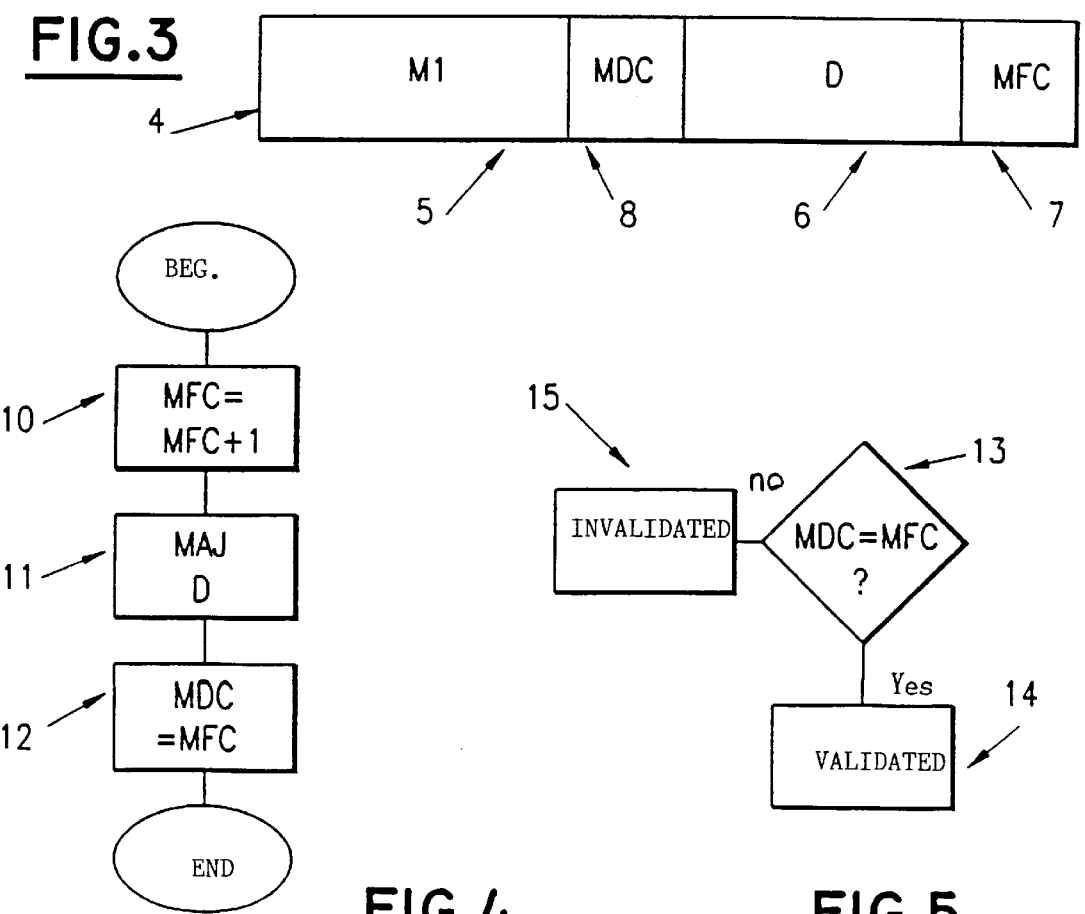
FIG.3
FIG.4
FIG.5

PROCESS AND DEVICE FOR VALIDATING/INVALIDATING A MESSAGE SENT OVER AN INFORMATION TRANSMISSION NETWORK BY MEANS OF A RESPONSE IN A COMMUNICATION FRAME

BACKGROUND OF THE INVENTION

The present invention concerns a process and a device for validating/invalidating a message sent over an information transmission network.

The present invention is more particularly concerned with a process and a device for validating a message sent over a network between at least two stations connected to the network by means of a response in a communication frame, the message including at least one header field sent by a first station and one data field sent by a second station.

In prior art transmission processes and devices of the above kind, also known as communication frame response processes and devices, at least one of the stations accesses the network in order to transmit the beginning of a message frame, also known as the header field, and in accordance with the message header field another station accesses the network to transmit the end of the message frame, containing event or data information from that station, the end of the frame being also generally known as the data field.

However, the above processes and devices give rise to a number of problems, in particular concerning updating and transmission of the data field. The time of transmission of the data is not under the control of the station producing the data, but rather that requiring the data.

If the station producing the data wishes to update it, there is a risk that the update will take place during the transmission of the data over the network, if the update is carried out in the meantime.

The risk is then that the corresponding station transmits internally inconsistent information, some of which has been updated and the remainder of which has not.

One prior art proposal for solving this problem is to add a validity marker to the data field, for example at the beginning of this field.

The marker is set to a particular value before any updating of the data and changed to a different value when the update has been done.

A station reading the data can then analyze the marker to determine if the data is being modified and updated or not and therefore if it should be regarded as valid or invalid.

However, this mechanism is inadequate as it does not solve the problem of transmitting an inconstant data field, in particular if the updates starts while the data is being transmitted.

The aim of the invention is therefore to solve these problems.

BRIEF SUMMARY OF THE INVENTION

To this end, the invention consists in a process for validating/invalidating a message sent over a information transmission network between at least two stations connected to said network by means of a response in a communication frame, the message including at least one header field sent by a first station and one data field sent by a second station, characterized in that the data field includes an end of field marker and a beginning of field marker, modified in a manner that respectively corresponds to the beginning and to the end of an operation to update the remainder of the data field carried out by the station concerned, to enable the message to be validated if the two markers correspond and to be invalidated if they do not agree.

In another aspect, the invention also consists in a device for implementing the above method.

BRIEF DESCRIPTION OF THE DRAWINGS

The invention will be better understood with the aid of the following description given by way of example only and with reference to the appended drawings, in which:

FIG. 1 represents a block schematic showing an information transmission network linking at least two stations;

FIG. 2 represents a message using a prior art communication frame response process;

FIG. 3 illustrates a message using a communication frame response process into which are integrated markers usable in a validation/invalidation process of the invention;

FIGS. 4 and 5 represent flowcharts illustrating a validation/invalidation process of the invention.

DETAILED DESCRIPTION OF THE INVENTION

Figure 6:
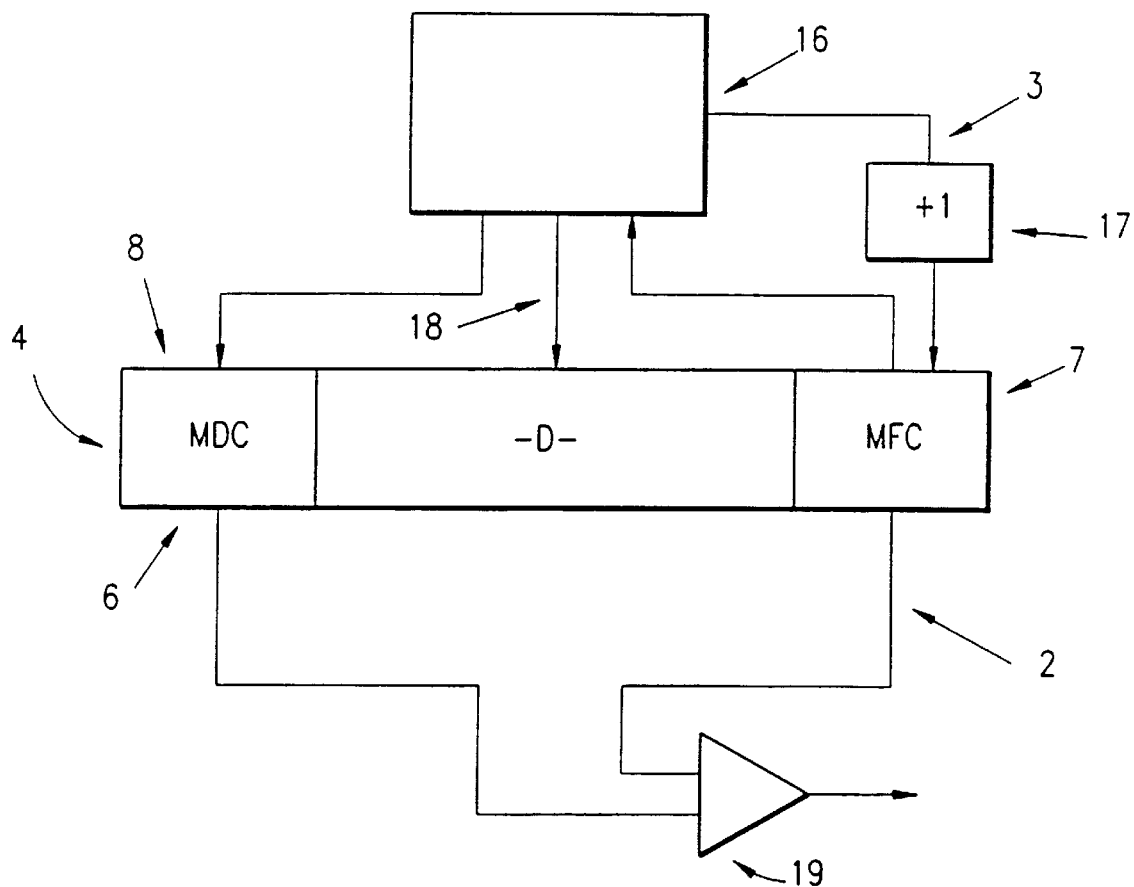
FIG. 6 represents a block schematic illustrating the structure of a device for implementing a process in accordance with the invention.

FIG. 1 shows an information transmission network 1 to which are connected at least two stations 2 and 3.

Messages pass over the network 1 to assure the communication of information between the stations.

One such message 4 is represented in FIG. 2.

Conventionally, a message 4 of the above kind includes at least one header field 5 and at least one data field 6.

In a communication frame response process the header field is sent by a first station M1, for example the station 2 represented in FIG. 1, and the data field 6 is sent by a second station M2, such as the station 3 in FIG. 1.

In the prior art this in-frame response process allows information to be transmitted between stations by means of messages that have identical frame formats, whether the messages are sent in their entirety by a first station or partly by a first station and partly by a second station, the first station sending the header field and the second station sending the data field.

As previously indicated, an in-frame response mechanism of this kind gives rise to a number of problems with updating and transmitting the data field.

To solve these problems, in the process of the invention, the data field 6 (FIG. 3) includes an end of field marker (MFC) 7 and a beginning of field marker (MDC) 8, the field markers being modified in manners respectively corresponding to the beginning and to the end of an operation to update the remainder of the data field, carried out by the station concerned, to enable validation of the message if the two markers correspond and invalidation of the message if the latter do not agree, for example for the first station, upon reading the message and more particularly the data field.

This process is illustrated in FIGS. 4 and 5.

FIG. 4 illustrates a procedure for updating the data field of a message which begins with step 10 in which the station concerned modifies the end of field marker (MFC) 7.

The modification can consist in incrementing the end of field marker (MFC), for example.

When the marker has been incremented, the station can then update the remainder of the data field 6 in step 11.

After this update operation, that is to say at the end of the procedure for updating the data field 6, the station concerned can modify the start of field marker (MDC) 8 in step 12 in a manner corresponding to the modification made to the end of field marker (MFC).

The modification of the beginning of field marker (MDC) can equally consist in incrementing the latter or merely copying the end of field marker (MFC) into the beginning of field marker (MDC) so that the latter contain corresponding values after the operation to update the remainder of the data field.

To allow validation or invalidation of this message, for example on reading the latter, it is then sufficient for the station reading the message to compare the beginning of field and end of field markers, as illustrated in FIG. 5, where this comparison step is designated 13.

If the markers correspond, the message is validated in step 14 whereas if the values do not agree the message is invalidated in step 15.

This solves the problems previously referred to concerning the transmission of an inconsistent message in which the data field contains information that has been updated and other information that has not been updated in the case where the data field is updated after transmission of a message over the network begins.

A process of the invention can be used by a device as illustrated schematically in FIG. 6, which shows the means enabling the stations 2 and 3 previously described to fulfil the functions referred to.

In this example, it is assumed that the data field 6 is produced by the station 3, the data fields being intended to be read at the station 2, the latter sending the message header over the network, for example.

For simplicity this figure shows only the data field 6 of the message 4.

As previously indicated the data field 6 includes an end of field marker (MFC) 7 and a beginning of field marker (MDC) 8.

The station 3 then includes a central information processing unit 16, for example, associated with an incremental counter 17, for example, adapted to increment or otherwise modify the end of field marker (MFC) 7 before the remainder of the data D is updated by the central unit 16.

The operation of updating the data field is symbolized by the access arrow 18 in this figure.

After the update operation, the central unit 16 of the station concerned is adapted to modify the beginning of field marker (MDC) 8 in a manner corresponding to the modification made to the end of field marker (MFC) so that the latter contain the same value, for example.

As previously indicated, the modification can equally consist in incrementing the beginning of field marker (MDC) and in this case the central unit 16 of the station includes another counter adapted to increment the beginning of field marker.

In the embodiment shown in this figure, modification of the beginning of field marker consists in the central unit 16 simply copying the modified end of field marker (MFC) into the beginning of field marker (MDC) so as to load the latter with corresponding values.

In this regard, note that the data field can be formed in any register of the station.

The data field being intended to be read at a station, for example station 2, the latter includes comparator means 19 (FIG. 6) adapted to compare the beginning of field marker and the end of field marker on reading the message to validate the message if the latter correspond and to invalidate the message if they do not agree.

The above validation and invalidation process and device guarantee the analysis of a message and in particular of a consistent data field because as soon as an operation to update the data field has begun and until it has finished the end and beginning of field markers do not have the same value.

In FIG. 6 discrete components have been shown for implementing the functions described but it goes without saying that the latter can equally be implemented by programming the central units of the stations in the conventional way.

What is claimed is:

1. A process for validating/invalidating a message sent over an information transmission network between at least two stations connected to said network by a communication response frame device, the message including at least one header field sent by a first station and one data field sent by a second station, comprising the steps of providing an end of field marker for the data field and a beginning of field marker for the data field, modifying the end of field marker and the beginning of field marker in a manner that respectively corresponds to the beginning and to the end of an operation to update the remainder of the data field carried out by the station concerned, and validating the message when the two markers correspond and invalidating the message when the two markers do not agree.

2. A process according to claim 1 wherein the step of modifying the markers consists of incrementing them.

3. A process according to claim 1 wherein the step of modifying the markers consists, in the station concerned, of modifying the end of field marker and copying the content of the end of field marker into the beginning of field marker.

4. A device for validating/invalidating a message sent over an information transmission network between at least two stations connected to said network by a communication response frame, the message including at least one header field sent by a station and one data field sent by a second station, characterized in that the data field includes an end of field marker and a beginning of field marker, in that the second station includes means for correspondingly modifying said markers, respectively at the beginning and at the end of an operation to update the remainder of the data field, and in that the first station includes means for validating/invalidating the message by comparing the beginning of field and end of field markers.

5. Device according to claim 4 characterized in that the means for modifying the fields includes means for incrementing them.

6. A device according to claim 4 characterized in that the means for modifying the beginning and end of field markers includes means for incrementing the end of field marker and means for copying the content of the latter into the beginning of field marker.

* * * * *